United States Patent
Szucs et al.

(10) Patent No.: US 10,987,708 B2
(45) Date of Patent: Apr. 27, 2021

(54) DRAIN CLEANING SYSTEMS USING SHEATH PROTECTED FLEXIBLE SHAFT

(71) Applicant: Ridge Tool Company, Elyria, OH (US)

(72) Inventors: Jeffrey Szucs, Columbia Station, OH (US); Alex Michael Cole, Columbia Station, OH (US); Nicholas Christopher Mavros, Columbia Station, OH (US); Billy Odon M. Yrad, Jr., Elyria, OH (US); Ken Beyer, Hamilton, MI (US)

(73) Assignee: Ridge Tool Company, Elyria, OH (US)

( * ) Notice: Subject to any disclaimer, the term of this patent is extended or adjusted under 35 U.S.C. 154(b) by 7 days.

(21) Appl. No.: 16/420,383

(22) Filed: May 23, 2019

(65) Prior Publication Data

US 2020/0238345 A1    Jul. 30, 2020

Related U.S. Application Data

(60) Provisional application No. 62/797,744, filed on Jan. 28, 2019.

(51) Int. Cl.
| | | |
|---|---|---|
| *B08B 9/045* | (2006.01) | |
| *F16C 1/06* | (2006.01) | |
| *E03F 9/00* | (2006.01) | |

(52) U.S. Cl.
CPC .............. *B08B 9/045* (2013.01); *E03F 9/005* (2013.01); *F16C 1/06* (2013.01); *B08B 2209/04* (2013.01)

(58) Field of Classification Search
CPC ....... B08B 9/045; B08B 2209/04; F16C 1/06; E03F 9/002; E03F 9/005
USPC ..................................................... 15/104.33
See application file for complete search history.

(56) References Cited

U.S. PATENT DOCUMENTS

| | | | | |
|---|---|---|---|---|
| 1,538,698 A | * | 5/1925 | Hall ........................ | B08B 9/045 |
| | | | | 15/104.095 |
| 3,317,943 A | * | 5/1967 | Primm .................... | E03C 1/302 |
| | | | | 15/104.33 |
| 6,421,871 B1 | | 7/2002 | Peach et al. | |
| 7,367,077 B2 | * | 5/2008 | Rutkowski .............. | B08B 9/045 |
| | | | | 15/104.31 |
| 8,646,143 B2 | * | 2/2014 | Lokkinen ............. | B65H 75/425 |
| | | | | 15/104.33 |

(Continued)

FOREIGN PATENT DOCUMENTS

GB        2117078 A   *  10/1983  ............... B08B 9/02

OTHER PUBLICATIONS

Large Clog Dog; https://www.clogsquad.com/product/116897/large-clog-dog; 3 pages, accessed Jun. 13, 2019.

(Continued)

*Primary Examiner* — Laura C Guidotti
(74) *Attorney, Agent, or Firm* — Mark E. Bandy; Rankin, Hill & Clark LLP

(57) ABSTRACT

A drain cleaning apparatus is described that uses a FlexShaft type drain cleaning cable. The drain cleaning apparatus includes a drum housing, a rotatable cable carrier mounted within an interior of the drum housing and a transmission assembly for transferring rotary power to an end of a FlexShaft cable residing in the interior of the drum housing. Also described are systems using these apparatuses in combination with a rotary power source such as a drill. In addition, various methods of use are described.

88 Claims, 12 Drawing Sheets

(56) References Cited

U.S. PATENT DOCUMENTS

| | | | |
|---|---|---|---|
| 9,265,263 B2 | 2/2016 | Whited et al. | |
| 2017/0268216 A1* | 9/2017 | Cole | E03C 1/302 |
| 2018/0085797 A1 | 3/2018 | Beyer | |

OTHER PUBLICATIONS

Mini Cleaner; https://www.picotesolutions.com/drain-cleaning; 3 pages, accessed Jun. 13, 2019.

Picote Maxi Miller Power + Operator's Manual; https://www.picotesolutions.com/operating-manuals; Jan. 9, 2019; 23 pages.

Picote Maxi Miller Operator's Manual; https://www.picotesolutions.com/operating-manuals; Jan. 9, 2019; 20 pages.

Picote Super Midi Miller Operator's Manual; https://www.picotesolutions.com/operating-manuals; Jan. 9, 2019; 20 pages.

Picote Midi Miller Operator's Manual; https://www.picotesolutions.com/operating-manuals; Jan. 9, 2019; 17 pages.

Picote Mini Miller Operator's Manual; https://www.picotesolutions.com/operating-manuals; Jan. 9, 2019; 22 pages.

Picote Micro Miller Operator's Manual; hilps://www.picotesolutions.com/operating-manuals; Jan. 9, 2019; 22 pages.

RCM-10, RCM-25, RCM-36 Cleaning units product brochure; https://www.renssi.cornien/products/machines-and-equipment/rcm-machines/; Mar. 18, 2019; 2 pages.

RCM-10 Safety and Instruction Manual; https://www.renssi.com/en/services/; Jan. 2019; 12 pages.

RCM-25 Safety and Instruction Manual; https://www.renssi.com/en/services/; Jan. 2018; 16 pages.

RCM-36 Safety and Instruction Manual; https://www.renssi.com/en/services/; Jan. 2018; 16 pages.

ZIP-ZIP FLEET Stationary Drum and ZIP-ZIP Revolution Rotating Drum; https://www.drainrehabsolutions.com/; 7 pages, accessed Jun. 13, 2019.

* cited by examiner

DRAIN CLEANING SYSTEMS USING SHEATH PROTECTED FLEXIBLE SHAFT

CROSS REFERENCE TO RELATED APPLICATION(S)

This application claims priority upon U.S. provisional application Ser. No. 62/797,744 filed Jan. 28, 2019.

FIELD

The present subject matter relates to drain cleaning machines, systems, and equipment used in performing drain cleaning.

BACKGROUND

The maintenance and cleaning of plumbing lines typically involves systems with special end fittings for example augers and cutter tools, that are fastened to the end of drain cleaning cables. One of the more recent developments found to be effective in drain cleaning has been a high speed system known in the art as "FlexShaft."

FlexShaft systems typically include a motor or drill connected to a flexible metal cable comprised of multiple, thinly wrapped, wires placed inside a polymeric hose. The cable typically spins between 1500 RPM and 3500 RPM but provides minimal torque at the end of the cable at which the cleaning attachment is located. The cable is inserted into a cleanout or other location in a drain and pushed into the drain until a blockage is encountered, at which point, the user applies power to the machine to spin the cleaning attachment and slowly clean the pipe. The user is required to slowly engage the blockage since the system does not provide enough torque to rapidly tear through the blockage and instead uses relatively high rotational speed of the cleaning attachment to scrape the inside of the pipe and ultimately remove the blockage.

Although satisfactory in many respects, a need remains for an improved drain cleaning system using FlexShaft cable.

SUMMARY

The difficulties and drawbacks associated with previous approaches are addressed in the present subject matter as follows.

In one aspect, the present subject matter provides a drain cleaning apparatus comprising a drum housing defining an interior region. The drain cleaning apparatus also comprises a cable carrier rotatably mounted within the interior region of the drum housing. And, the drain cleaning apparatus additionally comprises a transmission assembly mounted on the cable carrier and including an input component for engagement to a rotary power source and an output component for delivering rotary power to a drain cleaning cable end within the interior region of the cable carrier.

In another aspect, the present subject matter provides a drain cleaning apparatus comprising a drum housing having a front wall. The input component of the transmission assembly includes a rotatable input shaft located centrally along and accessible through the front wall of the drum housing.

In still another aspect, the present subject matter provides a drain cleaning apparatus comprising a drum housing having a front wall, an oppositely directed rear wall, and a generally hollow interior region defined between the front wall and the rear wall. The apparatus also comprises a cable retention assembly disposed along the rear wall within the interior region of the drum housing. While the illustrated embodiments of the present subject matter show the cable retention assembly as unitary with the cable carrier (since the cable carrier shown was made by an injection molding process), if the cable carrier had been made, for example of metal, it can be appreciated that a functionally-equivalent cable retention assembly could be designed to be removably mountable to the metal cable carrier. The cable retention assembly includes (i) a pair of lips spaced apart to receive the drain cleaning cable, and (ii) a removable plate positioned over at least one of the drain cleaning cable and the output component of the transmission assembly.

In yet another aspect, the present subject matter provides a drain cleaning apparatus comprising a drum housing defining an interior region and a drain cleaning cable. The apparatus also comprises a cable carrier rotatably mounted within the interior region of the drum housing. The cable carrier includes a first circumferential outer wall and a concentrically disposed secondary wall. The first wall and the secondary wall define a cable channel. The secondary wall is spaced from the first wall by a radial distance R, the radial distance R being within a range according to formula (I): $1.0 \times D < R < 2.0 \times D$, wherein D is the outer diameter of the drain cleaning cable.

In still another aspect, the present subject matter provides a system comprising (i) a rotary power source and (ii) a drain cleaning apparatus including a drum housing defining an interior region, a cable carrier rotatably mounted within the interior region of the drum housing, and a transmission assembly mounted on the cable carrier and including an input component for engagement to a rotary power source and an output component for delivering rotary power to a drain cleaning cable end within the interior region of the cable carrier.

In another aspect, the present subject matter provides a system comprising (i) a rotary power source and (ii) a drain cleaning apparatus including a drum housing. The drum housing includes a front wall, and a transmission assembly disposed in the drum housing. The transmission assembly includes a rotatable input shaft. The input shaft is accessible along the front wall of the drum housing and located at a central location along the front wall.

In still another aspect, the present subject matter provides a system comprising (i) a rotary power source and (ii) a drain cleaning apparatus including a drum housing including a front wall, an oppositely directed rear wall, and a generally hollow interior region defined between the front wall and the rear wall, a transmission assembly disposed in the interior region of the drum housing. The transmission assembly includes an output component for delivering rotary power to a drain cleaning cable end within the interior region of the drum housing. The apparatus also includes a retention assembly for a sheath of a drain cleaning cable. The retention assembly includes (i) a pair of lips spaced apart to receive the drain cleaning cable disposed between the lips and (ii) a removable plate positioned over at least one of a drain cleaning cable and the output component of the transmission assembly.

In yet another aspect, the present subject matter provides a system comprising (i) a rotary power source and (ii) a drain cleaning apparatus including a drum housing defining an interior region, a drain cleaning cable, and a cable carrier rotatably mounted within the interior region of the drum housing. The cable carrier includes a first circumferential outer wall and a concentrically disposed secondary wall, the first wall and the secondary wall defining a cable channel, the secondary wall spaced from the first wall by a radial distance R, the radial distance R being within a range according to formula (I):

$$1.0 \times D < R < 2.0 \times D \tag{I}$$

wherein D is the outer diameter of a sheath of the drain cleaning cable.

In yet another aspect, the present subject matter provides a method of drain cleaning comprising providing a drain cleaning apparatus. The apparatus includes a drum housing defining an interior region, a cable carrier rotatably mounted within the drum housing, and a drain cleaning cable. Typically, at least a portion of the drain cleaning cable is retained within the cable carrier. The method also comprises inserting a distal end of the drain cleaning cable into a drain line. And, the method comprises rotating the drain cleaning cable.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides drain cleaning devices, apparatuses, and/or systems comprising a drum housing that is used in association with known FlexShaft drain cleaning cables. The drum housing serves to store and/or retain the FlexShaft cable and may additionally promote dispensing and/or retraction of the cable. The drum housing also includes a drum or cable carrier which is rotatably mounted within the interior of the drum housing. The drain cleaning apparatuses and systems also comprise a transmission assembly for transferring rotary power from a power source to the FlexShaft cable.

Figure 1:
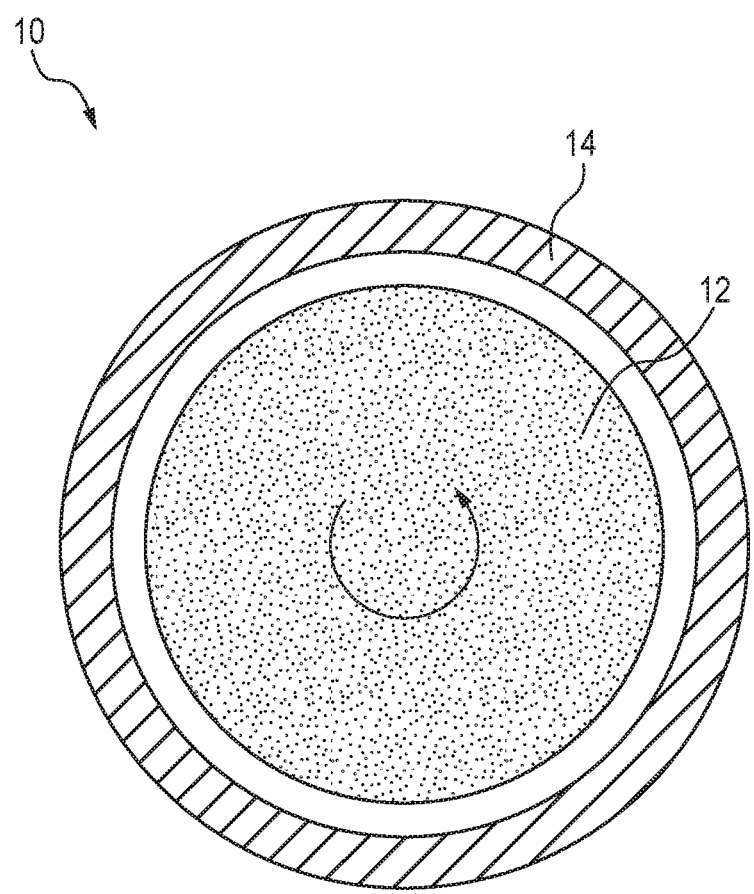
FIG. 1 is a schematic cross sectional view of a typical FlexShaft cable.

The flexible drain cleaning cable or shaft, herein generally referred to as a FlexShaft cable or FlexShaft, includes a rotatable flexible cable or shaft that moves independently of a sheath that surrounds the cable. FIG. 1 schematically illustrates a typical FlexShaft cable 10. FIG. 1 shows a cross section of a rotating internal cable 12 or shaft within the interior of a non-rotating sheath 14. Due to the fact the sheath 14 does not rotate with the FlexShaft cable 12, this provides a convenient contact region for the user to control and manipulate the cable.

The devices of the present subject matter also reduce wear on the internal faces of the drum, as the sheath acts as a wear barrier between the drum and rotating cable or shaft. The term "internal faces of the drum" refers to surfaces of the drum that contact or potentially contact the flexible drain cleaning cable or shaft. Because the rotating cable does not directly contact the interior of a drum, it is expected this may promote longer drum life. Additionally, since the outer diameter of the sheath is smooth, it is easier to wipe contaminates and drain waste from the sheath's outer surface, which promotes a cleaner process for the user. Further benefits in improved cleanliness result from the sheath covering the rotating shaft or cable. Traditional exposed wound cables retain water and debris which will spin off upon cable rotation.

The device also comprises a transmission to which a rotary power source such as a drill is engaged. The transmission is capable of effectively transmitting energy such as rotary motion from the power drill or alternative power source directly to an input side of the transmission which may be a flexible shaft or other component of the transmission as described in greater detail herein. The transmission may additionally include provisions for selectively transferring power from the power drill or other power source to the FlexShaft. An example of such provisions is a power control switch. Providing a readily accessible power control switch of the system to users, gives the user greater control and more precise control of the cleaning process.

The cable carrier is configured to rotate within the stationary drum housing, in such a way that the cable carrier is not in direct contact with the user. This helps reduce the occurrence of pinch points particularly when the system is used or transported.

In addition, the drain cleaning devices of the present subject matter provide an improved ergonomic interface between the user and the machine. This provides an additional utility to the drain or sewer cleaning user. These aspects are described in greater detail herein.

The present subject matter also provides an improved method of drain and sewer cleaning. The devices and systems provide an alternative method to the professional or lay person. This alternative method may be desirable over traditional methods using known devices including drum machines, sectional machines, jetters, hand powered devices, or drill powered devices used to clean drains, pipes, and tubes.

In comparison to traditional cleaning machines, the present subject matter enables effective cleaning though the use of high RPM, low torque applications. The term "high RPM" as used herein refers to a rotational speed of the FlexShaft cable within a range of from 1,000 RPM to 4,000 RPM. However, it will be understood that the present subject matter is not limited to these operational RPMs and includes rotational speeds less than 1,000 RPM and/or greater than 4,000 RPM.

The end effectors or cleaning tools typically utilized with FlexShaft applications are designed to abrade or "mill" away debris within the cleaning environment, as opposed to tools used in applications based on slower rotational speeds and higher torque in which such tools are designed to bite into a blockage to be displaced. The FlexShaft system utilizes fittings and/or cleaning tools made to conform to the inside of the pipe being cleaned. The benefit with these fittings is that they are capable of cleaning within a range of pipe diameters. This is advantageous for applications in which the user must go through a smaller pipe cleanout to gain access to a blockage in a larger pipe. These fittings are also effective when multiple pipe diameters are to be cleaned.

A feature of the devices, apparatuses, and systems of the present subject matter is the ability to be powered by a battery operated drill, thereby enabling greater flexibility and versatility. In many embodiments, an input shaft of the transmission is located in the center of the drum housing. While FlexShaft cable is pulled from the drum housing machine, the drill or other rotary power source connected to the input side of the transmission remains stationary, but permitted to move with the user. This enables localized or selective cleaning of only desired region(s) of a pipe interior. In contrast, traditional jetter systems typically clean the entire length of the pipe interior.

Additional details and aspects of the drain cleaning devices, apparatuses, and systems of the present subject matter are as follows.

Drum Housing

The drum housing of the present subject matter provides an interior region within which the FlexShaft cable is stored or retained during non-use. The drum housing is typically cylindrically shaped or partially cylindrical in shape. However, the present subject matter is not limited to cylindrical shapes or drum shapes and includes a wide array of other shapes and configurations. In particular versions, the drum housing is configured to typically lay horizontally when in use, and to typically stand vertically when in storage. In this regard, the term "horizontal" refers to the plane of a front face of the drum housing oriented generally horizontal or parallel to a floor or substrate. And the term "vertical" refers to the plane of the front face of the drum housing oriented generally vertical.

Figure 2A:
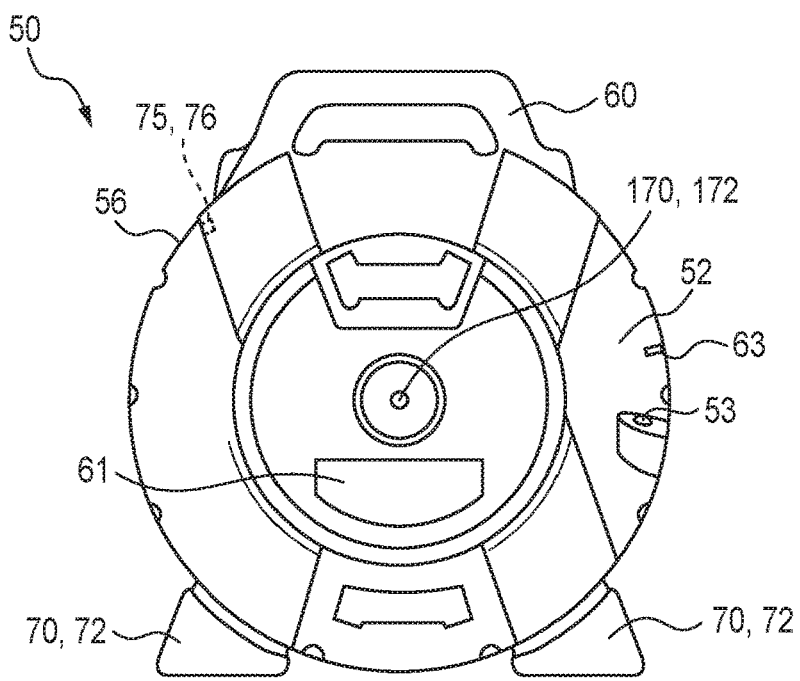
FIG. 2A is front view of an embodiment of a drum housing of a drain cleaning apparatus in accordance with the present subject matter.
Figure 2B:
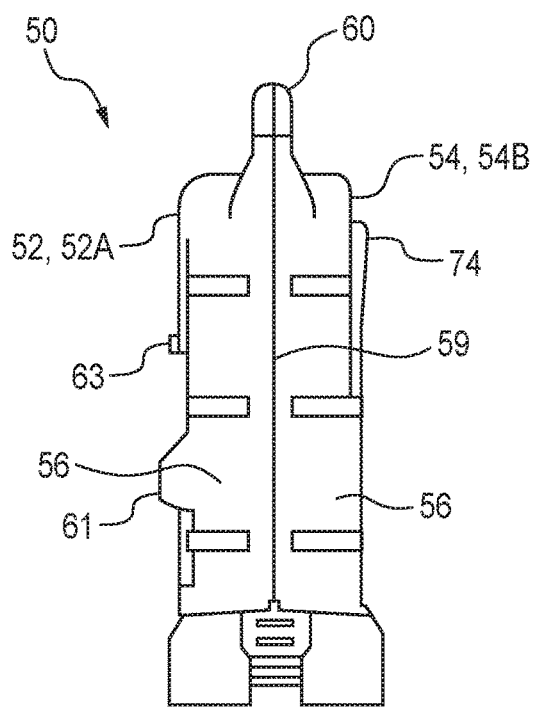
FIG. 2B is a side view of the drum housing depicted in FIG. 2A.

The drum housing can be formed from injection molded polymeric material. The drum housing can be provided in a clamshell configuration. In such versions, the drum housing comprises front and back components, which may or may not be identical. FIGS. 2A and 2B illustrate an embodiment of a drum housing 50 in accordance with the present subject matter. The drum housing 50 includes a front wall 52, an oppositely directed rear wall 54, and a generally circumferential side wall 56 extending between the front and rear walls 52, 54. In the particular version shown in the referenced figures, the drum housing is formed from a front component 52A and a rear component 54B which contact and engage each other along an interface 59 that generally bisects the drum housing 50. The drum housing 50 also defines a cable port 53 through which the FlexShaft cable may extend. The cable port 53 provides access into the interior of the drum housing 50. The cable port 53 can include a protective insert which can serve to protect against wear on the drum housing 50 as FlexShaft cable is advanced or retracted relative to the drum housing 50. The protective insert may be formed from a material exhibiting a relatively low coefficient of friction and in certain versions, such material exhibits a coefficient of friction that is less than the coefficient of friction of the material of the drum housing. In particular versions, the inner span or opening, i.e., inner diameter, of the protective insert is slightly larger than the outer diameter of the FlexShaft cable, thereby resulting in the protective insert also providing a wiping function to rid excess liquid or debris on the outer surface of the FlexShaft cable as the FlexShaft cable is retracted into the drum housing 50. The drum housing 50 optionally includes a transport handle 60 typically extending from the side wall 56. The drum housing 50 may also include a secondary transport handle 61 provided along an outer face such as on the front wall 52. The drum housing 50 may additionally include a cable retention clip 63 typically provided near the cable port 53. The cable retention clip 63 serves to releasably engage a portion such as a distal end or other region of the FlexShaft cable. Retaining or holding the FlexShaft cable along the drum housing 50 promotes ease in transporting and storing the drum housing 50 when containing cable. Otherwise, the interior cable carrier can rotate relative to the drum housing and cable may be inadvertently advanced or fed out from the drum housing.

Figure 3:
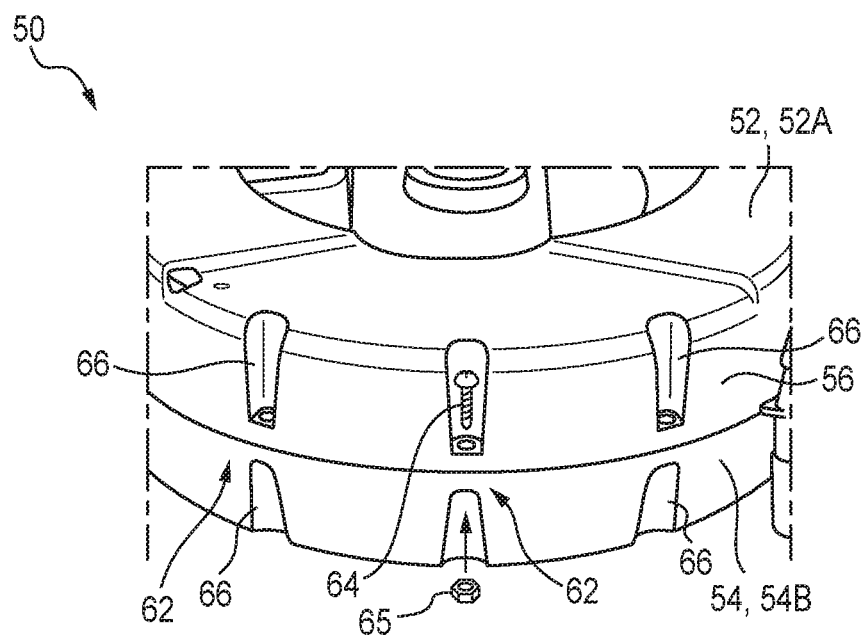
FIG. 3 is a partial perspective view of a region of the drum housing, illustrating optional fasteners for the drum housing.

The housing sections, i.e., front and rear components 52A and 54B, are typically fastened together via fasteners located around the circumference of the drum housing. FIG. 3 shows one embodiment of the fastening configuration, comprised of a bolted joint assembly 62. Specifically, the bolted joint assembly 62 typically includes a threaded fastener 64 extending between apertured mating wall regions of the front and rear components 52A and 54B. The fastener 64 can engage internal threads in the wall regions or engage a corresponding threaded nut 65 or other fastener. The front and rear components 52A and 54B can define recessed regions 66 for receiving a bolted joint assembly 62. The present subject matter also includes alternative techniques and assemblies for joining the housing components together. Nonlimiting examples include toggle clamps, over-center clamps, slide locks, and similar mechanisms. In addition, alternate fastener configurations and tool-less access methods and components could potentially be utilized.

Figure 4:
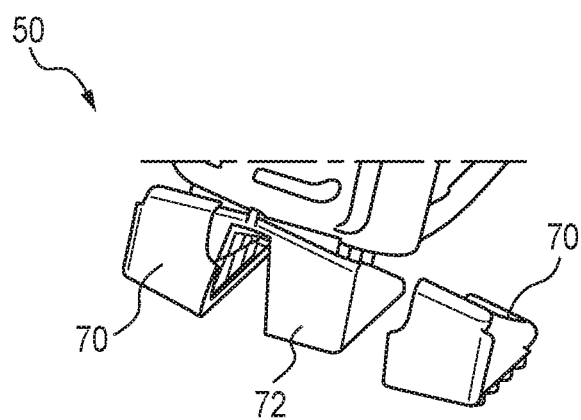
FIG. 4 is a detailed perspective view of optional feet components used in association with the drum housing.

Rubberized feet, made from a slip resistant polymeric material, can optionally be provided on the housing. Referring to FIG. 4, feet 70 can cover protrusions or projections 72 located on the drum housing 50. The feet 70 and/or protrusions 72 serve to stabilize the drum housing 50. The fit between the feet 70 and housing protrusions 72 will provide sufficient frictional engagement to remain on the housing without the use of fasteners. FIG. 4 shows the rubberized feet 70 mating to the protrusions 72 located on the housings, fastened via an interference fit. Typically, the feet 70 are located along a region of the drum housing 50 and in particular the side wall 56, opposite from the handle 60 as depicted in FIG. 2A. However, the present subject matter includes a wide array of varying locations for the feet and/or the handle.

The drum housing 50 may also include a removable drain plug 75 as shown in FIG. 2A that allows users to drain the system of any contaminates found in the drum housing or system. The plug 75 can include a rubber insert, screw, plug, or cap which may or may not be tethered to the housing 50 to prevent loss. Once removed, the drum housing 50 is oriented such that liquids or other debris are urged toward an aperture 76 or hole defined in the housing 50 which the plug, screw, insert, or cap covers during use. In many versions, the aperture 76 and associated drain plug 75 are located along a region of the front wall 52 and near the handle 60, as shown in FIG. 2A. This location results in the aperture 76 positioned away from liquid or debris within the interior of the drum housing during use and storage positions of the drum housing. The drum housing is oriented horizontally and with front wall 52 directed downwards for drainage. The relatively high location of the aperture 76 and drain plug 75 ensures against inadvertent escape or leakage of liquid or debris from the drum housing during use or storage.

Figure 5A:
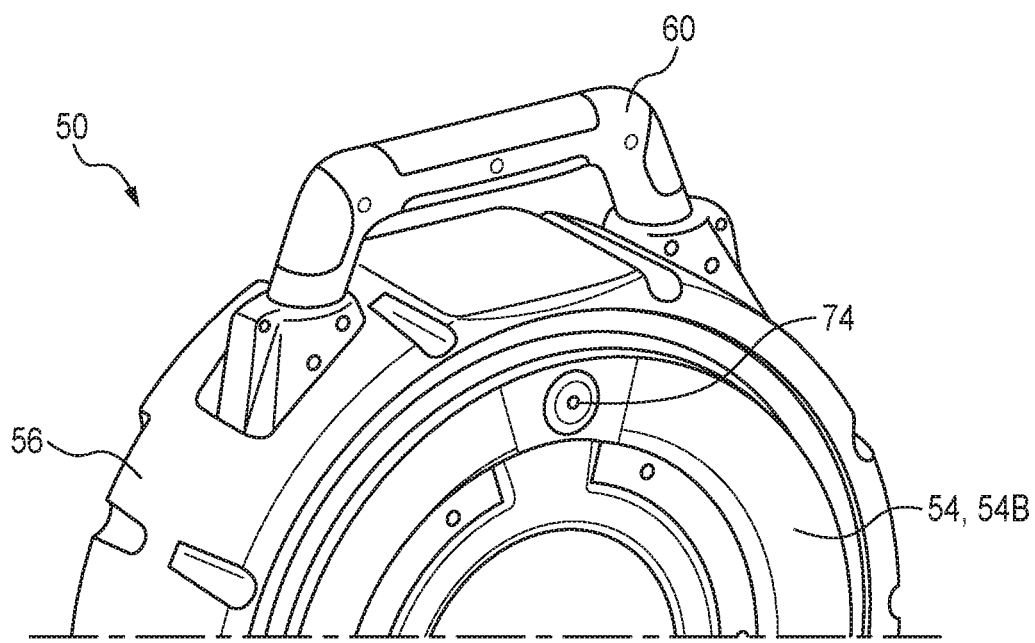
FIG. 5A is a partial perspective view of an upper region of the drum housing.
Figure 5B:
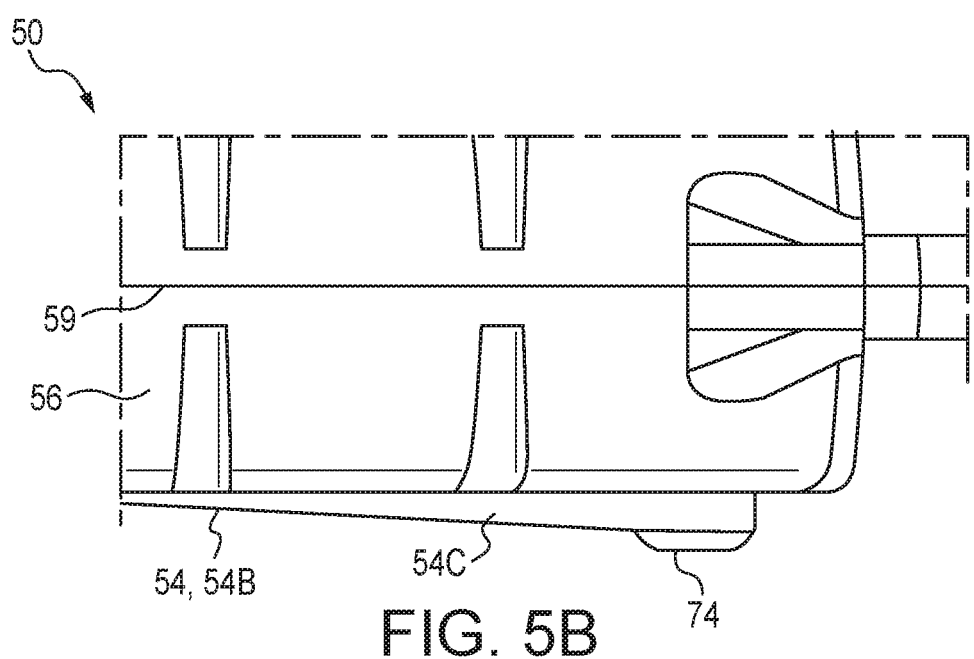
FIG. 5B is a schematic top view of the drum housing showing one or more grommets or feet.

Referring to FIGS. 5A and 5B, in particular versions, one or more grommet(s) 74 or feet may be provided along a rear wall 54 of the drum housing 50. These serve to improve stability of the drum housing 50 and protect any work surface(s) when laid horizontally with its rear wall 54 facing downward.

FlexShaft Cable

The FlexShaft drain cleaning cable used in the machines and systems of the present subject matter typically includes a protective sheath, a rotatable shaft, cable, or component located within the sheath, a driver end coupling which is typically crimped onto the shaft or cable, and one or more collars crimped on the cable on the end opposite of the driver end. Such additional collars may also serve to protect the cable from components such as set-screws, and/or provide precise locations for tool spacing.

Figure 6A:
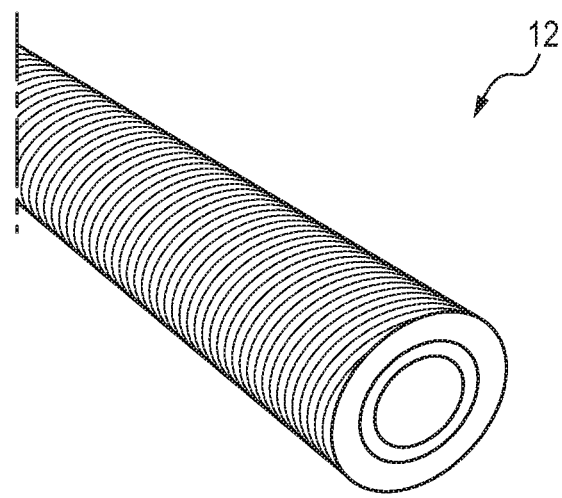
FIG. 6A is a schematic perspective end view of a portion of a FlexShaft cable with its outer sheath removed.
Figure 6B:
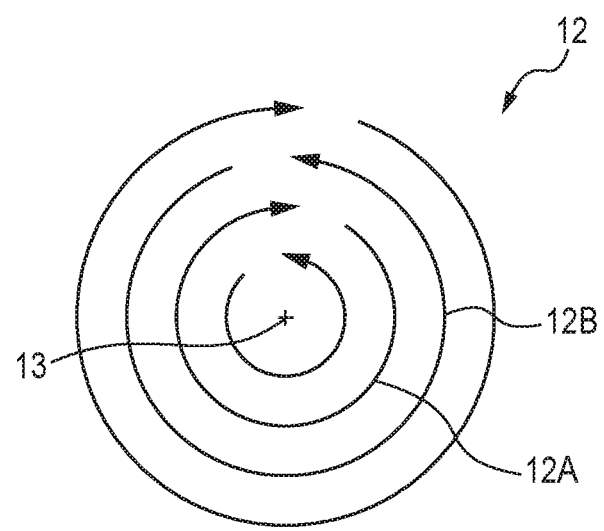
FIG. 6B is a schematic cross section of the FlexShaft cable of FIG. 6A illustrating winding directions of multiple layers of wire.

The FlexShaft cable transmits torque from the transmission to the distal end of the cable at which is located the cleaning attachment or tool. As will be understood, torque transmission is performed by the inner rotatable shaft. If a cable construction is used instead of a shaft, the inner rotating cable for torque transmission may for example be constructed of high tensile strength wires, for example steel, wrapped around an inner core. The FlexShaft cable includes multiple layers of the same wire without an inner core. Multiple layers of wire typically constitute the desired diameter of cable, which also affects the flexibility of the resulting cable, and therefore, range of pipe sizes the cables are effectively capable of cleaning. Cables or layers thereof, may or may not be wound in opposing directions, which is a method utilized for manufacturing cables capable of withstanding torque in either the clockwise or counter-clockwise direction. FIG. 6A schematically illustrates the internal cable 12 of the FlexShaft cable 10 of FIG. 1, in which the outer sheath 14 is removed. FIG. 6B is a schematic cross section of the internal cable 12 showing winding layers wound around a preceding layer in the opposite direction. Specifically, in certain versions, the rotatable cable 12 includes a plurality of wound wire layers. For example, the plurality of wound wire layers can include a first wire layer 12A wound in a clockwise direction about a center axis 13 of the cable 12, and a second wire layer 12B wound in a counter-clockwise direction about the center axis 13. The second wire layer 12B is located immediately adjacent to the first wire layer 12A. The cable 12 may include additional layers. Thus, it will be understood that the present subject matter includes a variety of FlexShaft cable types including those using a rotatable shaft disposed within a sheath, and those using a wire-based construction which is rotatable within a sheath.

Figure 7A:
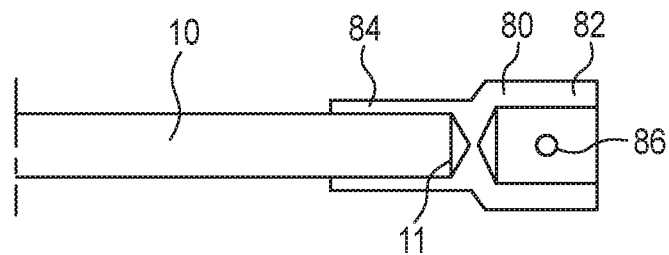
FIG. 7A is a schematic cross sectional view of a proximal or driven end of a typical FlexShaft cable in accordance with the present subject matter.

The driver end is the location at which mechanical power is transferred from the transmission. The fitting to which the transmission is coupled is typically mechanically crimped onto the FlexShaft cable, and comprises a bucket end type configuration, with an assembly of a shoulder screw, pin, detent pin, and/or shear pin to function as a coupling pin to connect the transmission to the crimped fitting of the FlexShaft cable. FIG. 7A schematically illustrates a cross section of a crimped fitting or coupling 80. Specifically, the fitting 80 is crimped or otherwise engaged to a proximal end 11 of the FlexShaft cable 10. The fitting 80 includes a receiving face or region 82 for receiving a source of rotary power, and a cable receptacle 84 for receiving the proximal end 11 of the cable 10. The region 82 includes the noted shoulder screw 86 or other coupling pin for securing to the transmission upon engagement therewith. One or more shear pin(s) can be used to limit the torque to which the cable is exposed.

The sheath that surrounds the shaft or cable is typically constructed as a composite, with a fibrous membrane located in between two regions of polymeric materials. The polymeric materials are chosen for wear resistance and chemical compatibility, while the fibrous layer increases the assembly's tensile strength. The sheath may also be in the form of a single layer. The sheath is typically cut slightly shorter than the length of the shaft or cable, such that a section of the rotating shaft or cable is exposed on both ends in order to crimp and/or insert fittings for the cleaning system and/or process.

Figure 7B:
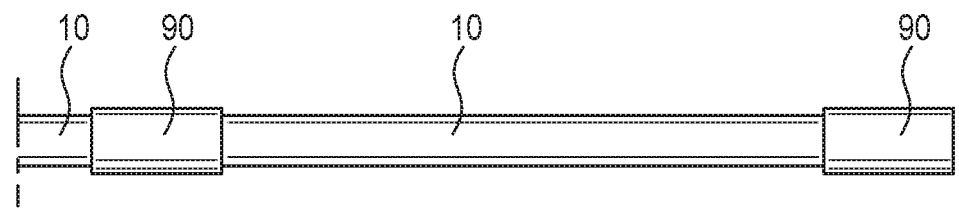
FIG. 7B is a schematic view of multiple sections of FlexShaft cables engaged together.

In some embodiments, cleaning tools may be fastened to the shaft or cable of the FlexShaft using set screws. To prevent cable damage or fraying from over tightening the set screws, collars may be crimped onto the cable for the set screws to engage. The end tools are designed to slide over the collars, and provide a rigid surface for the set screws, and act as a shield for the shaft or the individual wires that make up the interior cable. FIG. 7B schematically illustrates multiple sections of FlexShaft cable 10 adjoined or engaged with each other using collars or unions 90.

The cable assembly typically also includes an effective amount of a quantity of lubricant injected into the sheath that reduces the friction between cable sheath and the rotatable shaft or cable. Cable soaked in a bath of lubricant allows for thorough penetration of lubricant between wire gaps and layers.

Typically, when utilizing FlexShaft cable with the drain cleaning devices described herein, the length of the FlexShaft cable depends upon the outer diameter of the FlexShaft cable, i.e., D. For a ¼ inch D, the cable length is typically 50 feet. For a 5/16 inch D, the cable length is typically 70 feet. It will be understood that the systems of the present subject matter can utilize a wide range of lengths of FlexShaft cable such as less than 50 feet and greater than 70 feet.

Although the present subject matter is described in conjunction with FlexShaft cable, it will be understood that conventional drain cleaning cable within a sheath could potentially be used with the systems described herein. In addition, the present subject matter includes the use of unidirectional FlexShaft cable. It is also contemplated that a wide array of sheaths and flexible cable enclosures can be used such as but not limited to hydraulic or pneumatic tubing, hydraulic or pneumatic hose, other polymeric materials, non-polymeric materials, composite materials, metal and the like, and combinations thereof. It is also contemplated that the sheath may include a single layer or multiple layers with or without strengthening membranes.

Provisions for Rotatably Mounting Cable Carrier in Housing

Figure 8:
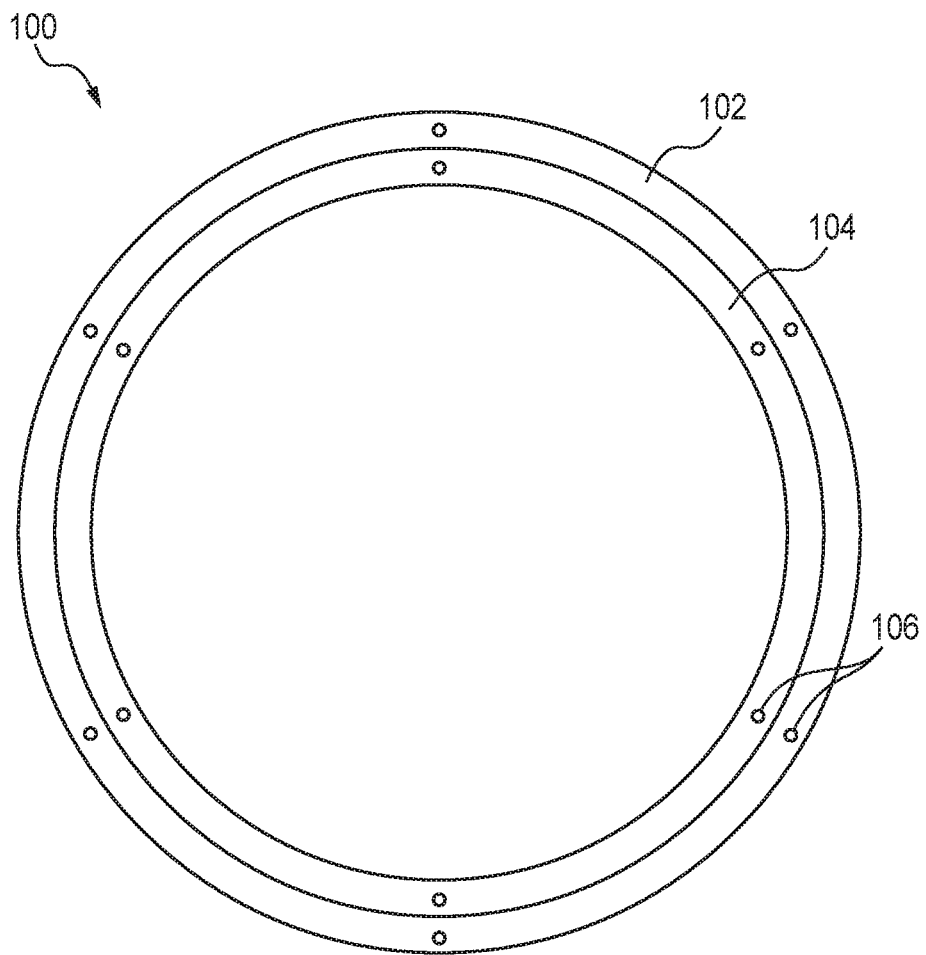
FIG. 8 is a schematic view of a bearing assembly used in the drain cleaning apparatuses of the present subject matter.

In many embodiments, mounted on the inside of the drum housing is a turntable style bearing, or more commonly referred to as a "lazy susan" or slewing ring type bearing. The primary function of the bearing or bearing assembly is to provide smooth, rotary motion for the internal drum cable carrier, which rotates as cable is extracted from and retracted into the drum housing. FIG. 8 schematically illustrates a typical bearing assembly 100.

The bearing assembly 100 typically comprises two races, with a plurality of ball bearings positioned between the races as rolling elements, which may or may not contain a cage to separate the bearings. In the embodiment of FIG. 8, the bearing assembly 100 includes an outer race 102 and an inner race 104. The bearing assembly 100 includes the plurality of ball bearings (not shown) located between the races 102, 104. The inner and outer races may or may not include drilled and tapped holes 106 for attaching the bearing assembly 100 to an interior face of the drum housing 50. The other race is used to support the rotatable cable carrier.

In certain versions, the holes in both races may or not be made identical and are drilled and tapped to provide secure fastening directly to the bearing assembly 100 without the use of a nut, a configuration which also preserves space.

Although various embodiments of the drain cleaning apparatuses and systems use a lazy susan type bearing assembly for rotatably supporting the cable carrier, the present subject matter includes variations and alternate provisions. For example, one or more rollers could be utilized to rotatably support the cable carrier. In addition, one or more bushings could be utilized. One or more low friction pads could be positioned between the cable carrier and the drum housing. In addition, it will be understood that such provisions could be located along an interior front wall of the drum housing instead of or in addition to locating such provisions along the rear wall of the drum housing.

Cable Carrier

Figure 9:
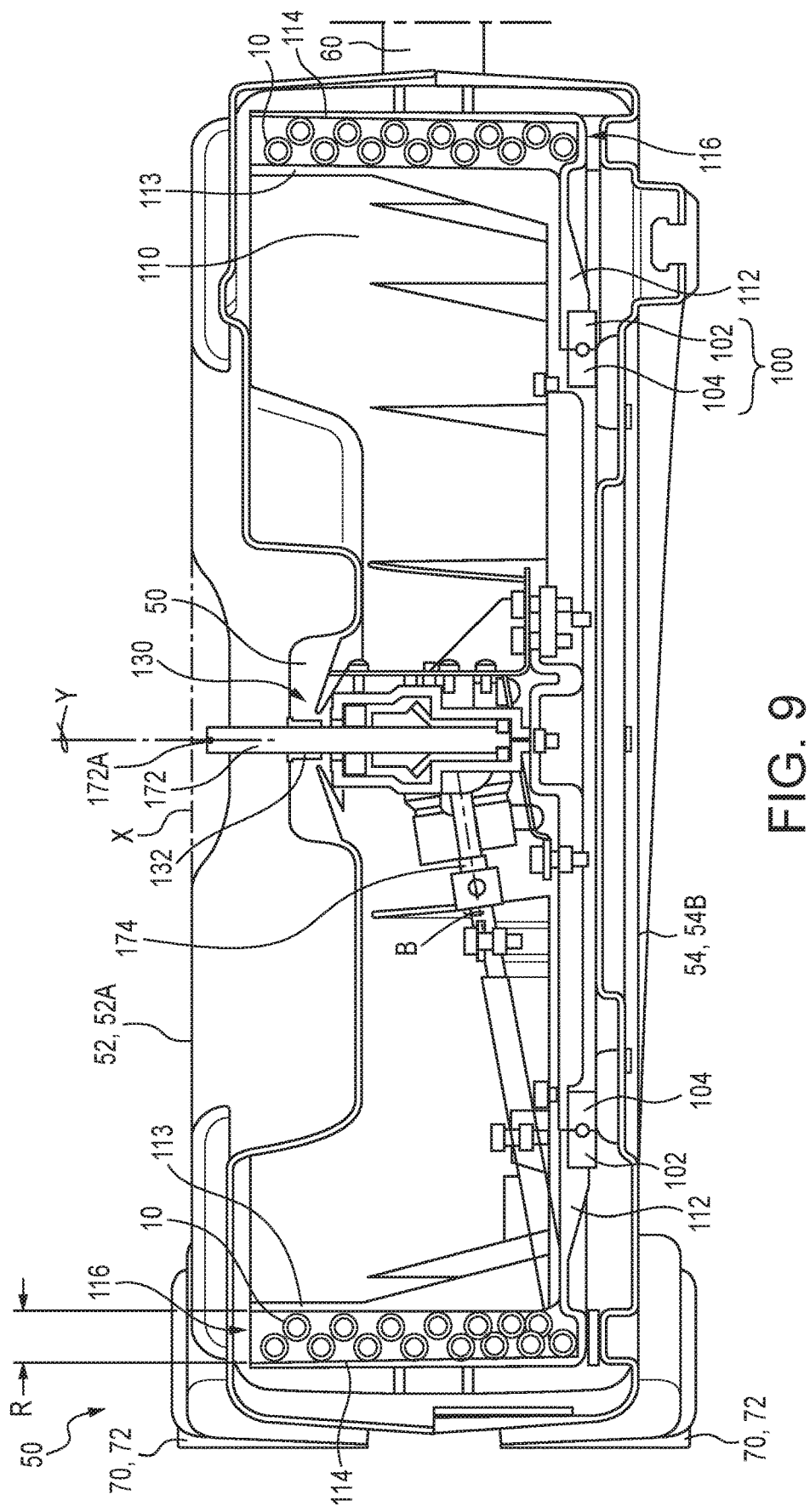
FIG. 9 is a schematic cross sectional view of an embodiment of a drain cleaning apparatus in accordance with the present subject matter.

Positioned within the drum housing 50 is the rotatable cable carrier. There are several functions for the internal drum cable carrier. A primary function is to hold the FlexShaft cable when not in use, and to smoothly displace cable when in use. FIG. 9 shows a schematic cross section of the drum housing 50, with a drum or cable carrier 110. The cable carrier 110 is rotatably mounted within the interior of the drum housing 50. The cable carrier 110 is typically circumferentially shaped and includes a rear wall 112 and a circumferential side wall 114. As previously noted, the cable carrier 110 is rotatably supported within the drum housing 50 by a lazy susan bearing 100. One or more bushings 132 can be utilized to promote rotation of an input shaft 172 relative to the drum housing 50. The bushing(s) 132 may also serve to provide rotational support of the input shaft 172. In particular versions, a distal face 172A of the input shaft 172 is located below the plane X of the front wall 52 as shown in FIG. 9. The input shaft 172 is a component of the transmission assembly 170 shown in FIGS. 10-13. This configuration reduces the potential for damage to the input shaft 172 particularly when the drum housing 50 is positioned horizontally on its front wall 52. And when the drum housing 50 is positioned horizontally on its rear wall 54, the front wall 52 or plane X constitutes the highest location of the drum housing 50.

The cable carrier 110 can be configured to provide a cable channel 116 in which the FlexShaft cable 10 is stacked or coiled, which is illustrated in FIG. 9. The cable channel 116 is typically located alongside an interior face of the circumferential side wall 114 and in many versions between the circumferential side wall 114 and a secondary internal side wall 113. In these versions, the side walls 114 and 113 extend transversely from the rear wall 112. In certain embodiments, the secondary internal side wall 113 is typically concentrically positioned within the side wall 114 and is spaced therefrom by a radial distance R. Thus, in these versions, R constitutes a width dimension of the cable channel 116. The rear wall 112 can also include a depression or recessed receiving region to facilitate retaining of the FlexShaft cable 10 near the side wall 114. FIG. 9 further illustrates the bearing assembly 100 with races 102, 104 rotatably supporting the cable carrier 110 within the interior of the drum housing 50.

In particular embodiments, the cable channel 116 is sized to reduce the potential of adjacent regions of FlexShaft cable 10 from laying immediately alongside each other with relatively large areas of contact between cable regions occurring. That configuration can lead to "pinching" of cable 10 within the cable channel 116 and in certain instances result in cable entanglement. As noted, the cable channel 116 is preferably sized to exhibit a width R that promotes staggered stacking of FlexShaft cable 10 within the cable channel 116. In particular versions, the width R of the cable channel 116 is within a range defined in Formula (I) of from 1 to 2 times the outer diameter D of the FlexShaft cable:

$$1.0 \times D < R < 2.0 \times D \qquad (I)$$

As noted, D is the outer diameter of the sheath of the FlexShaft cable used in association with the device. It will be understood that the present subject matter is not limited to this aspect and includes other configurations and widths for the cable channel.

Figure 10:
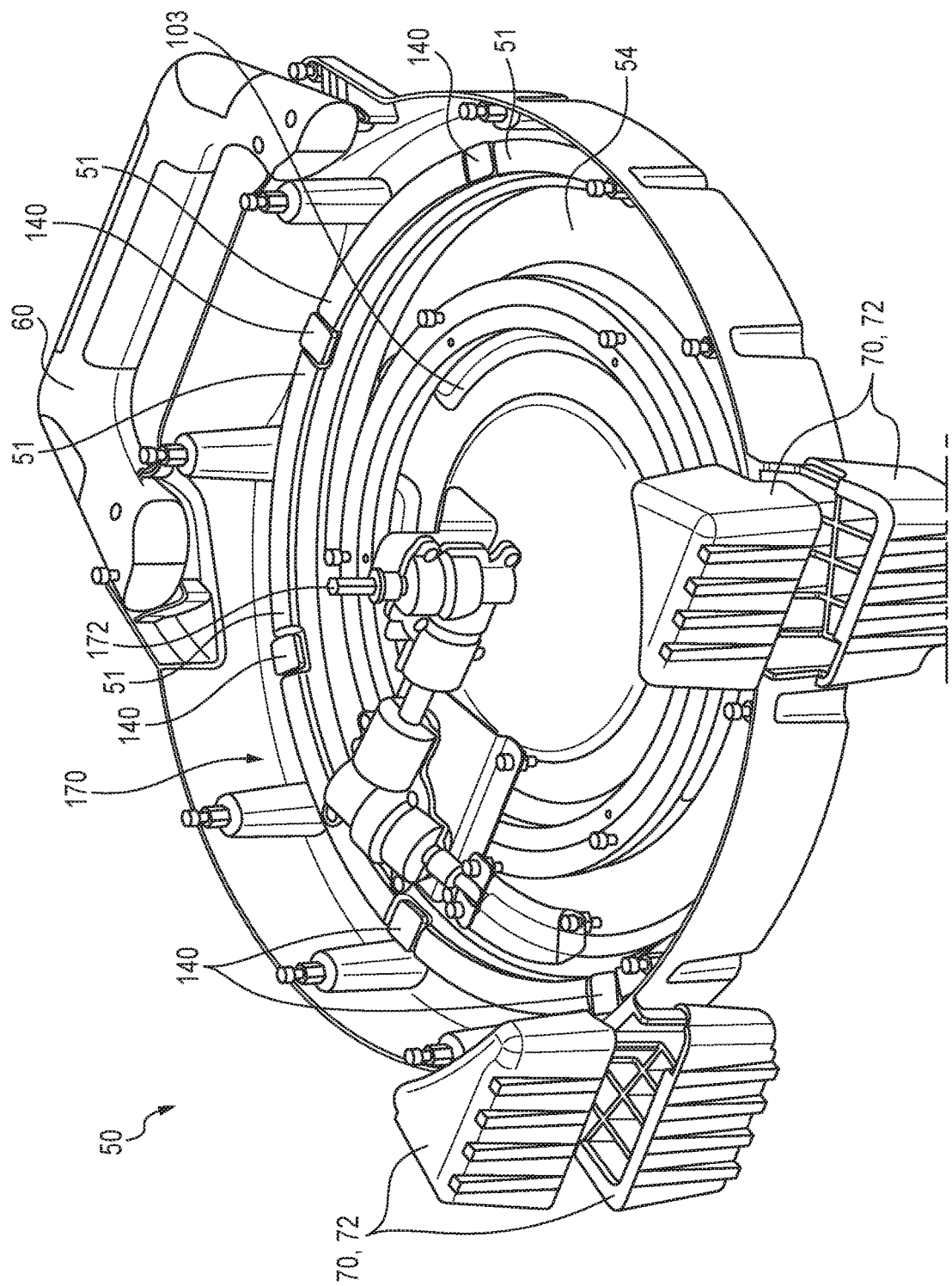
FIG. 10 is a schematic perspective view of the drain cleaning apparatus depicted in FIG. 9, illustrating additional aspects of the system.

FIG. 10 shows another view of the system with the inner cable carrier removed. Thus, in this figure the transmission assembly 170 and a cable retention platform (described in greater detail herein) are shown "floating." Underneath the rotatable cable carrier 110 (not shown in FIG. 10), i.e., along the rear wall 54, are a plurality of optional wear pads 140 typically made from polymeric material. Typically, the wear pads are formed from a material exhibiting a relatively low coefficient of friction. Typically, the material of the wear pads exhibits a coefficient of friction that is less than the coefficient of friction of the material of the drum housing. These wear pads 140 are configured to make contact with the rotating cable carrier 110 in the event the carrier 110 is stressed and contacts the interior of the drum housing 50. In many versions, the wear pads 140 are raised and extend above adjacent surface(s) of the drum interior shown in FIG. 10 as surfaces 51. The wear pads 140 also serve a structural function. In the event the machine is dropped or otherwise stressed, the pads 140 make contact with the cable carrier 110 to help safely redirect forces to the drum housing 50. The pads 140 are adhered to the interior of the drum housing 50, but may also be fastened mechanically. However, many embodiments allow the pads 140 to be replaced. FIG. 10 also depicts one or more optional clamp plates 103. The clamp plate(s) 103 are located between the drum housing 50 and the inner race 104 of the bearing assembly 100. The one or more clamp plate(s) serve to distribute loads and forces between the bearing assembly 100 and the drum housing 50.

Figure 11:
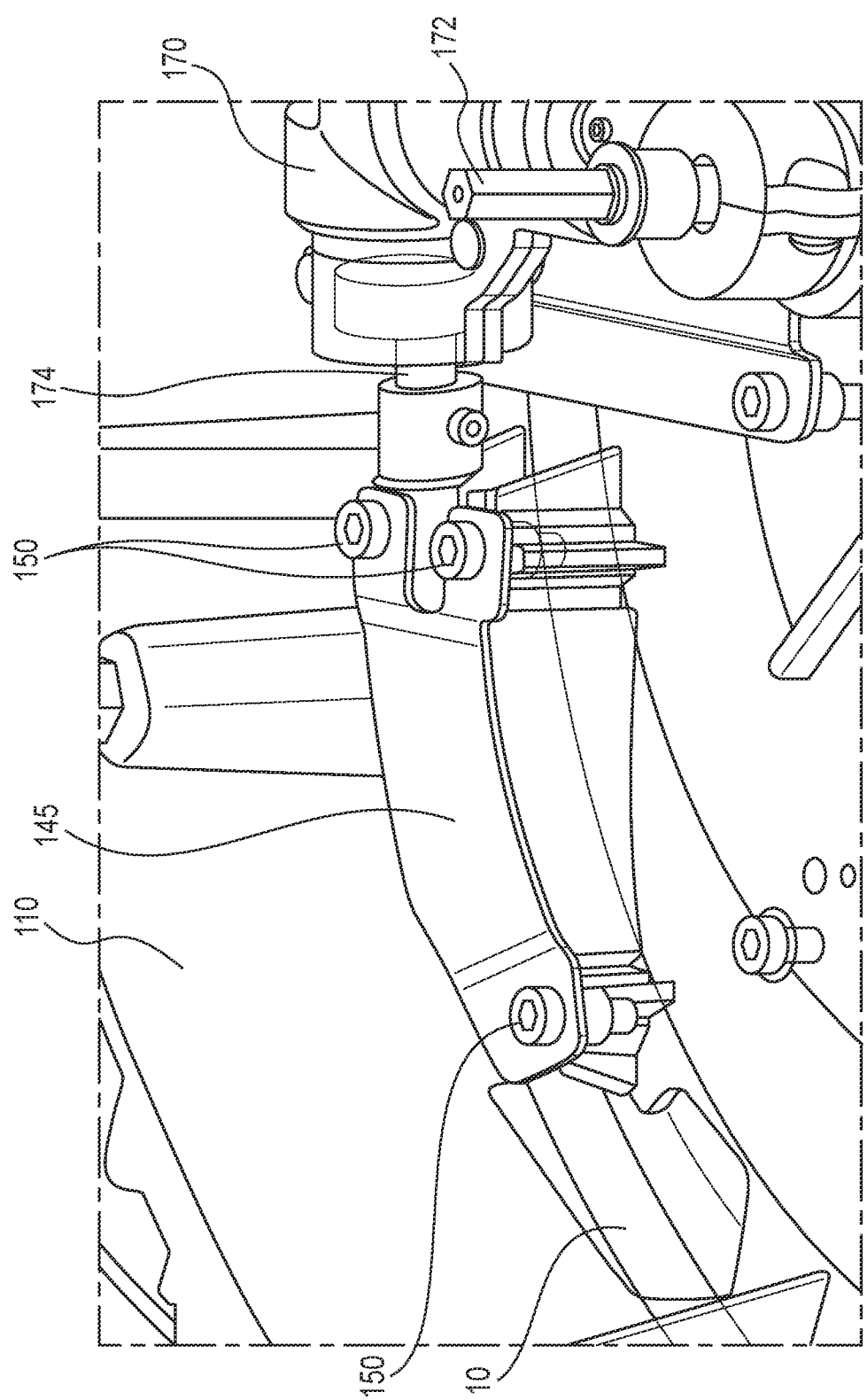
FIG. 11 is a detailed view of an embodiment of a cable retention assembly optionally used in the drain cleaning apparatus of the present subject matter.

In certain embodiments, the present subject matter also includes a cable retention assembly. FIG. 11 shows an end of a FlexShaft cable 10 within the cable carrier 110 which is rotatably supported in the drum housing 50. A plate 145 or fastening component can be used to assist in securing the cable within the cable carrier 110, and particularly along the rear wall 112 of the cable carrier 110. The purpose of this, in addition to securing the cable, is to reduce the amount of unrestricted cable in the system. The more secure the FlexShaft cable, the less potential for cable "flip over" or twisting in the cable carrier when the FlexShaft cable encounters difficult obstructions. The plate 145 is designed to be removable in order to replace the cable 10, and may or may not be secured to the cable carrier 110 using a bolted connection or self-tapping screws 150. The plate 145 is typically positioned over the sheath causing interference to thereby hold the sheath in place.

Figure 12:
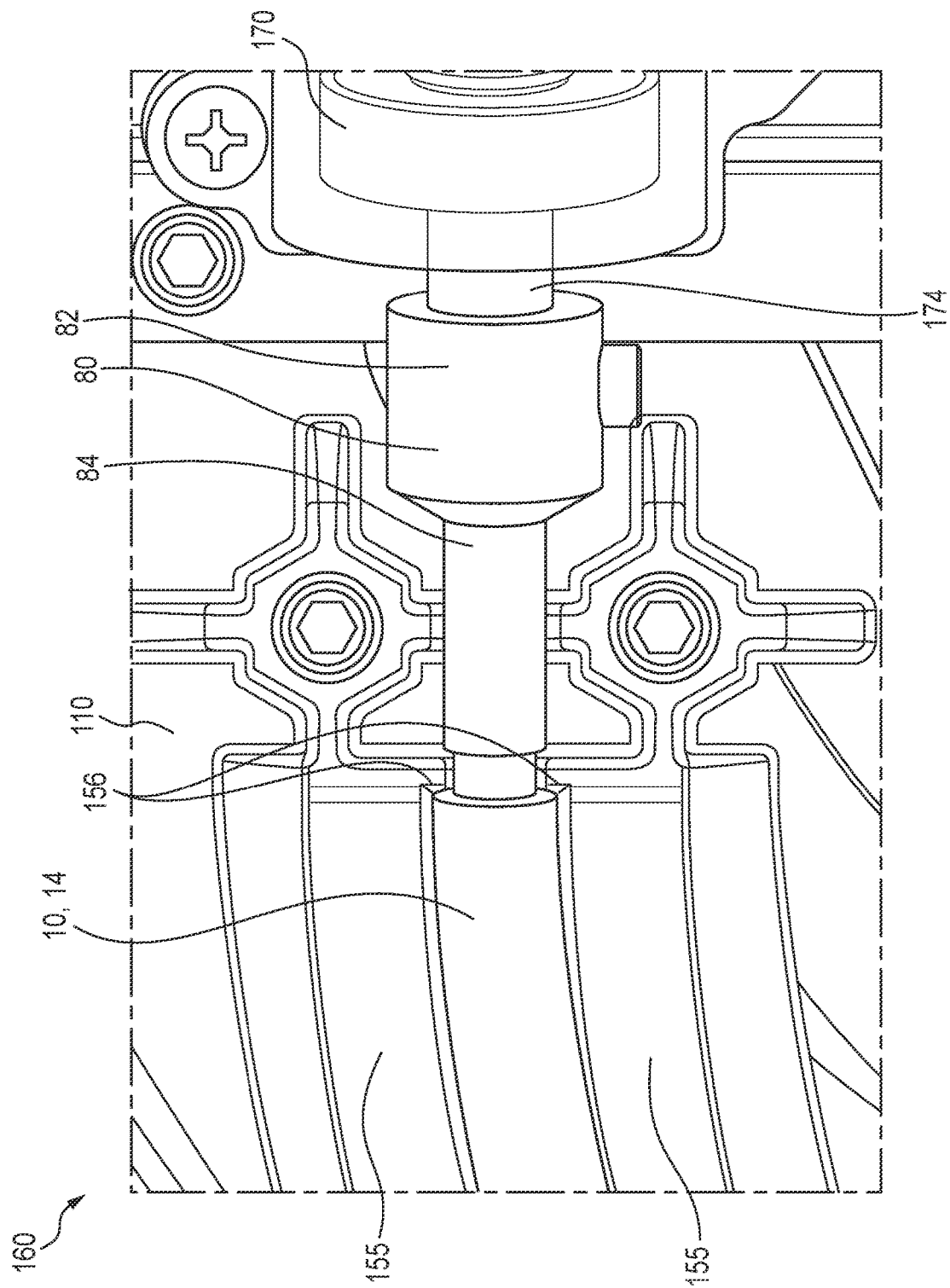
FIG. 12 is a detailed view of an embodiment of a cable retention platform optionally used in the drain cleaning apparatus of the present subject matter.

Referring to FIG. 12, the cable carrier 110 can also include a cable retention component that has an integrated geometry within the cable carrier 110 configured to constrain and direct the cable 10 to a channel such as the cable channel 116 that houses the remainder of the cable. The component or region 160, generally referred to as a cable "retention platform", allows the FlexShaft cable 10 to take the largest possible bend with respect to the location of the transmission 170 and/or gearboxes.

In the top view of the cable retention platform 160 schematically illustrated in FIG. 12, one or more lips 155, 156 or raised wall region(s) allow the user to correctly insert and seat the FlexShaft cable 10 in the platform 160 in such a way that the sheath 14 does not contact the coupling 80, which rotates as the machine is used. The lip(s) 155 serve to limit lateral movement of the cable 10 and are typically spaced apart from one another a distance sufficient to receive the cable 10 placed therebetween. Items 156 are wall(s) that locate the sheath as it is assembled. Wall(s) 156 prevent the sheath from contacting the rotating crimped drive lug of the cable. The structural components of the cable retention platform 160 such as the lips 155 and/or the walls 156 are formed with or otherwise affixed to the rear wall 112 of the cable carrier 110. It will be appreciated that the present subject matter includes other configurations for the cable retention platform 160. Furthermore, it will be understood that the present subject matter includes devices, apparatuses, and/or systems that do not utilize such components and/or platforms.

Transmission

The devices, apparatuses system also comprises an assembly for transferring rotary power from a drill or other power source to the FlexShaft cable. The transmission allows the user to maintain a stationary location at which a power drill or other power source is connected. In many embodiments, the transmission includes an input shaft that will rotate, but not translate with respect to the system during use. The transmission also comprises an output component for delivering rotary power to a FlexShaft cable end within the interior region of the drum housing and more particularly within the cable carrier. The transmission is generally shown as transmission 170 in the referenced figures.

A wide array of rotary power sources can be coupled to the input shaft of the transmission for providing rotary power to the transmission and ultimately to the FlexShaft cable. Power drills can be used. Although battery powered drills are preferred for many applications, corded drills can also be used. It is also contemplated that other portable rotary power sources can be used. In addition, impact power tools could be used to supply rotary power to the transmission.

In many embodiments, the input shaft 172 of the transmission 170 is located and accessible along the front wall 52 of the drum housing 50. And, in particular versions, the input shaft 172 is located at a central location along the front wall 52 of the drum housing 50, such as shown in FIG. 2A. Positioning the input shaft 172 at a central location and orienting the shaft 172 to rotate about an axis Y as shown in FIG. 9 that is parallel, coextensive, or coaxial with an axis of rotation of the cable carrier 110, results in improved operational efficiencies and additional benefits.

Figure 13:
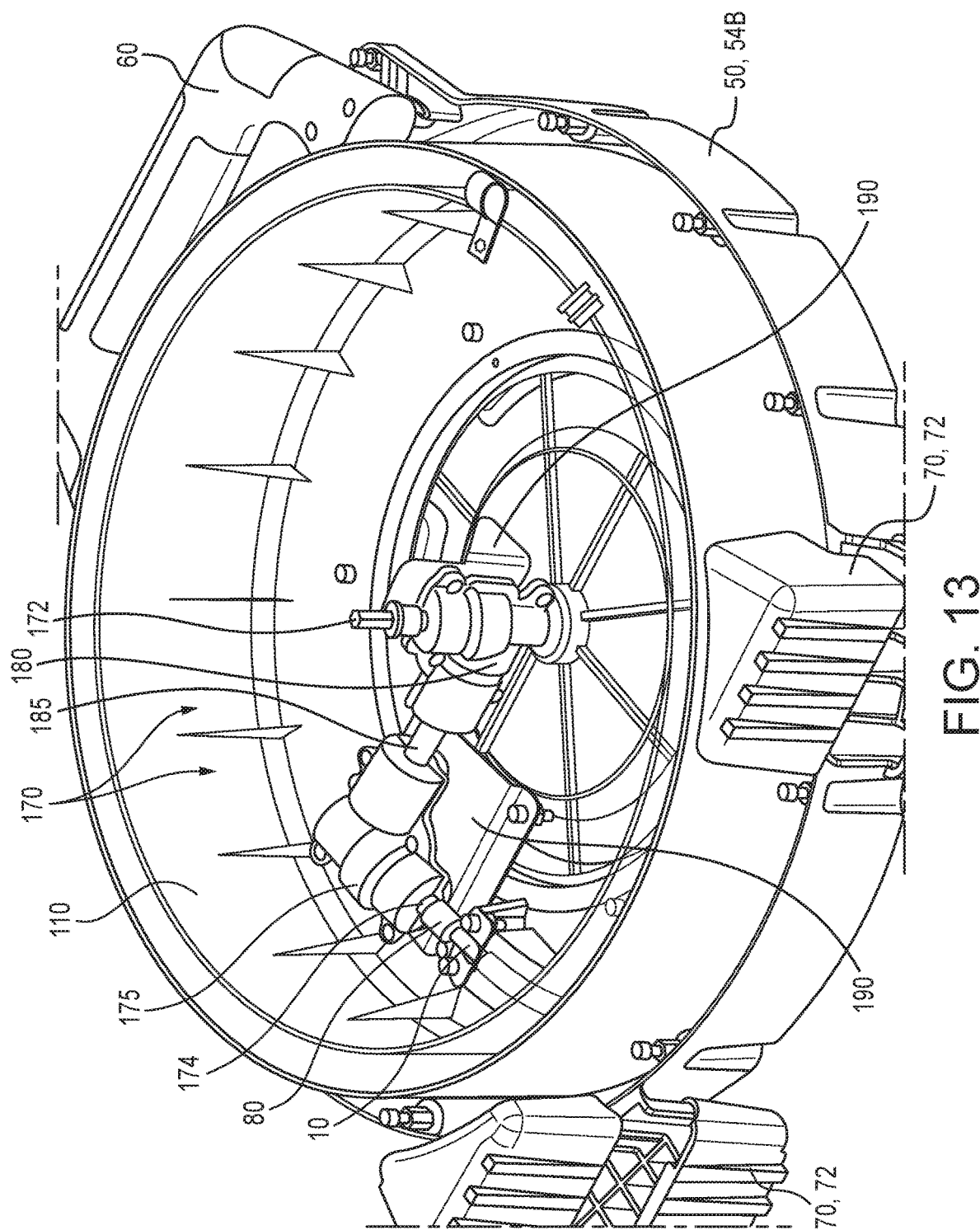
FIG. 13 is a schematic perspective view of the drain cleaning apparatus showing additional aspects of the apparatus.

Referring to FIG. 13, the transmission 170 may comprise one or more gears that redirect power from a rotary power source such as a user supplied device. The transmission 170 may additionally use belt(s). The present subject matter includes other alternative configurations including but not limited to FlexShaft with two bends, and/or bent FlexShaft with a gearbox. The input shaft 172 may be in the form of a hex shape shaft that accepts a multipoint Jacob's chuck from the user supplied power source. The present subject matter can include other configurations for the input shaft. Non-limiting examples of other configurations for the input shaft 172 include shaft cross sectional shapes that are square, triangular, round, oval, and other shapes. Power is transferred from the input shaft, through a series of gearboxes comprised of miter, bevel, or spiral bevel gears, and redirected to an output 174 and ultimately to the crimped fitting on the FlexShaft cable. The FlexShaft cable can be coupled to one of the shafts on the gearbox with a pin or shoulder screw. In many versions, it may be preferred to couple the FlexShaft cable to one of the shafts on the gearbox with a headed detent pin. The present subject matter includes other engagement or coupling provisions such as shear pin(s) or other pin(s) as known in the art.

FIG. 13 shows an example of the internal transmission 170, comprised of two 90 degree gearboxes 175, 180 coupled together with drive 185 and optional spring or shear pins, screws, or keys. The transmission or drive train 170 transfers rotary power applied at the input shaft 172 such as for example by a drill, to the coupling or fitting 80 of the FlexShaft cable 10.

Brackets 190 can be used to orient the gearboxes 175, 180 in a direction desired for operation, and are fastened to the cable carrier 110. Due to the fact that the brackets 190 are fastened to the cable carrier 110, the transmission component(s) will rotate with the cable carrier 110 as the FlexShaft cable 10 is pulled from the housing 50. The input and output shaft 172, 174 of the transmission assembly 170, the internal rotating cable 12 of the FlexShaft cable 10, and the user supplied power source (not shown) are kinematically dependent upon the rotation of the cable carrier 110. As the carrier 110 rotates when cable 10 is expelled, the rotary input 172 of the system will rotate. Any rotation due to torsion potential energy will be directed toward the unrestricted end of the cable body containing the cleaning tool, if the input 172 is held from rotating as the drum is rotated, for example if the drill handle is held or the drill is restricted from rotating.

In certain versions, the transmission 170 as depicted in FIGS. 10-13, is oriented such that the rotational axis B of the output 174 extends at a non-transverse angle with respect to the axis Y of the input shaft 172. Referring to FIG. 9, the non-transverse angle between rotational axis B of the output 174 and the axis Y of the input 172 is typically within a range of from 91° to 135° and generally from 95° to 125°.

The transmission 170 in the apparatuses and systems of the present subject matter may optionally comprise a clutch. The clutch may or may not be adjustable, but is configured to disengage rotary power from the user supplied input device to either the input gearbox 175 and/or 180 or after the gearbox 175 and/or 180 between the input 172 and FlexShaft drive coupling 80. In many embodiments, the clutch selectively disengages or interrupts rotary power transfer from a rotating input component to the FlexShaft cable 10. Alternatively or in addition, one or more shear pin(s) can be used in the drivetrain. The clutches and/or shear pin(s) can be located between the coupling and the gearbox shaft, between gearboxes, and/or between the input shaft and the external power source which as noted can be a drill.

The present subject matter also provides various methods of drain cleaning using the systems described herein. Generally, the methods comprise providing a drain cleaning apparatus or device with one or more FlexShaft cables as described. A distal end of the FlexShaft cable, typically also including a tool attached thereto, is inserted into a drain or sewer line, or other component of interest. As will be understood, the proximal end of the FlexShaft cable is attached to the transmission of the drain cleaning system. The method also comprises rotating the FlexShaft cable to thereby rotate the tool. Typically, rotation is performed by rotatably driving the input of the transmission using a drill or other source of rotary power. The method may additionally comprise extending or advancing the FlexShaft cable relative to the drain cleaning system.

The drain cleaning systems of the present subject matter can be used with a wide array of tools, components, and accessories. For example, in certain applications, the drain cleaning systems can be used with "knockers" which are tools typically attached at a distal end of the drain cleaning cable and used to effectively clean rust, dirt, and/or debris from a pipe or drain line. Most knockers include one or more sections of chain which are flung radially outward as the tool is rotated. One or more carbide inserts can be brazed or otherwise attached to the chain section(s) to promote cleaning and reduce wear otherwise occurring on the chain surfaces.

In many embodiments, the drain cleaning apparatuses of the present subject do not include an internal power source such as an electric motor, which would for example be mounted within the drum housing or otherwise mounted on the device. Thus, in these embodiments, the drain cleaning apparatuses are free of a power source such as internal or integral power sources such as for example electric motors.

The present subject matter provides particular versions of the drain cleaning devices or apparatuses.

In one embodiment, the present subject matter provides a drain cleaning apparatus comprising a drum housing defining an interior region. The drain cleaning apparatus also comprises a cable carrier rotatably mounted within the interior region of the drum housing. And, the drain cleaning apparatus additionally comprises a transmission assembly mounted on the cable carrier and including an input component for engagement to a rotary power source and an output component for delivering rotary power to a drain cleaning cable end within the interior region of the cable carrier.

In another embodiment, the present subject matter provides a drain cleaning apparatus comprising a drum housing which includes a front wall. The apparatus also comprises a transmission assembly disposed in the drum housing. The transmission assembly includes a rotatable input shaft, the input shaft accessible along the front wall of the drum housing and located at a central location along the front wall.

In still another embodiment, the present subject matter provides a drain cleaning apparatus comprising a drum housing including a front wall, an oppositely directed rear wall, and a generally hollow interior region defined between the front wall and the rear wall. The apparatus also comprises a transmission assembly disposed in the interior region of the drum housing. The transmission assembly includes an output component for delivering rotary power to a drain cleaning cable end within the interior region of the drum housing. The apparatus also comprises a cable retention assembly disposed along the rear wall of the drum housing. The cable retention assembly includes (i) a pair of lips spaced apart to receive the drain cleaning cable disposed between the lips and (ii) a removable plate positioned over at least one of a drain cleaning cable and the output component of the transmission assembly.

In yet another embodiment, the present subject matter provides a drain cleaning apparatus comprising a drum housing defining an interior region and a drain cleaning cable. The apparatus also comprises a cable carrier rotatably mounted within the interior region of the drum housing. The cable carrier includes a first circumferential outer wall and a concentrically disposed secondary wall. The first wall and the secondary wall define a cable channel. The secondary wall is spaced from the first wall by a radial distance R, the radial distance R being within a range according to formula (I): $1.0 \times D < R < 2.0 \times D$, wherein D is the outer diameter of the drain cleaning cable.

The present subject matter also provides various systems using the drain cleaning devices or apparatuses. For example, systems of the drain cleaning apparatuses in combination with rotary power sources such as a drill are provided.

In one embodiment, the present subject matter provides a system comprising (i) a rotary power source and (ii) a drain cleaning apparatus including a drum housing defining an interior region, a cable carrier rotatably mounted within the interior region of the drum housing, and a transmission assembly mounted on the cable carrier and including an input component for engagement to a rotary power source and an output component for delivering rotary power to a drain cleaning cable end within the interior region of the cable carrier.

In another embodiment, the present subject matter provides a system comprising (i) a rotary power source and (ii) a drain cleaning apparatus including a drum housing. The drum housing includes a front wall, and a transmission assembly disposed in the drum housing. The transmission assembly includes a rotatable input shaft. The input shaft is accessible along the front wall of the drum housing and located at a central location along the front wall.

In another embodiment, the present subject matter provides a system comprising (i) a rotary power source and (ii) a drain cleaning apparatus including a drum housing including a front wall, an oppositely directed rear wall, and a generally hollow interior region defined between the front wall and the rear wall. The apparatus also includes a transmission assembly disposed in the interior region of the drum housing. The transmission assembly includes an output component for delivering rotary power to a drain cleaning cable end within the interior region of the drum housing. The apparatus also includes a retention assembly for a sheath of a drain cleaning cable. The retention assembly includes (i) a pair of lips spaced apart to receive the drain cleaning cable disposed between the lips and (ii) a removable plate positioned over at least one of a drain cleaning cable and the output component of the transmission assembly.

In another embodiment, the present subject matter provides a system comprising (i) a rotary power source and (ii) a drain cleaning apparatus including a drum housing defining an interior region, a drain cleaning cable, and a cable carrier rotatably mounted within the interior region of the drum housing. The cable carrier includes a first circumferential outer wall and a concentrically disposed secondary wall. The first wall and the secondary wall defines a cable channel, the secondary wall spaced from the first wall by a radial distance R, the radial distance R being within a range according to formula (I):

$$1.0 \times D < R < 2.0 \times D \qquad (I)$$

wherein D is the outer diameter of a sheath of the drain cleaning cable.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drain cleaning apparatus comprising:
a drum housing defining an interior region;
a cable carrier rotatably mounted about a first axis within the interior region, wherein the drum housing includes a front wall, a rear wall spaced from the front wall and a generally circumferential side wall extending between the front and rear walls for containing the cable carrier within the interior region;
a transmission assembly mounted on the cable carrier and including
an input component for engagement to a rotary power source, wherein the input component is rotatable about a second axis independently from the cable carrier and
an output component for delivering rotary power to a drain cleaning cable end within the interior region,
wherein the first and second axes are parallel or coaxial.

2. The drain cleaning apparatus of claim 1 further comprising: a drain cleaning cable, the cable defining a proximal end and an opposite distal end, wherein the proximal end is operatively engaged with the output component of the transmission assembly, wherein the output component is rotatable about a third axis spaced from and non-parallel to the second axis.

3. The drain cleaning apparatus of claim 2 wherein the drain cleaning cable is flexible and includes a protective sheath, and wherein the cable further includes a shaft located within the sheath, wherein the shaft is rotatable by the output component relative to the sheath.

4. The drain cleaning apparatus of claim 2 wherein the drain cleaning cable is disposed in an interior region of the cable carrier.

5. The drain cleaning apparatus of claim 4 wherein the cable carrier includes a circumferential outer wall and the drain cleaning cable is arranged in a coil adjacent to the circumferential outer wall.

6. The drain cleaning apparatus of claim 2 further comprising: a clutch for selectively disengaging the input component of the transmission assembly from the drain cleaning cable.

7. The drain cleaning apparatus of claim 1 further comprising: a bearing assembly disposed between the cable carrier and the drum housing, wherein the bearing assembly is for rotatably mounting the cable carrier relative to the drum housing.

8. The drain cleaning apparatus of claim 1 wherein the drum housing includes a handle.

9. The drain cleaning apparatus of claim 1 wherein the drum housing includes outwardly extending feet for stabilizing the drum housing.

10. The drain cleaning apparatus of claim 1 wherein the drum housing defines an aperture and a drain plug removably disposed in the aperture.

11. The drain cleaning apparatus of claim 10 wherein the aperture is defined within the front wall of the drum housing.

12. The drain cleaning apparatus of claim 1 further comprising: a plurality of wear pads secured along the rear wall of the drum housing.

13. The drain cleaning apparatus of claim 1 further comprising: a retention assembly for a sheath of a drain cleaning cable, wherein the retention assembly is disposed along a wall of the cable carrier.

14. The drain cleaning apparatus of claim 13 wherein the retention assembly includes a removable plate positioned over at least one of (i) the sheath of a drain cleaning cable and (ii) the output component of the transmission assembly.

15. The drain cleaning apparatus of claim 13 wherein the retention assembly includes a pair of lips spaced apart so as to receive a drain cleaning cable disposed between the lips.

16. The drain cleaning apparatus of claim 1 wherein the transmission assembly includes a plurality of gears engaged such that rotary motion of the input component is transferred to the output component.

17. The drain cleaning apparatus of claim 1 wherein the input component of the transmission assembly is accessible along the front wall of the drum housing.

18. The drain cleaning apparatus of claim 1 wherein the input component of the transmission assembly is located at a central location along the front wall.

19. The drain cleaning apparatus of claim 1 wherein the cable carrier includes a first circumferential outer wall and a concentrically disposed secondary wall, the first wall and the secondary wall defining a cable channel.

20. The drain cleaning apparatus of claim 19 wherein the secondary wall is spaced from the first wall by a radial distance R, and the radial distance R is within a range according to formula (I):

$$1.0 \times D < R < 2.0 \times D \qquad (I)$$

wherein D is the outer diameter of a sheath of a drain cleaning cable disposed in the cable carrier.

21. A drain cleaning apparatus comprising:
a drum housing defining an interior region, wherein the housing includes a front wall;
a transmission assembly disposed in the drum housing, wherein the transmission assembly includes an input shaft and an output component, wherein the input shaft is rotatable about a first axis relative to the drum housing and wherein the input shaft is accessible along the front wall of the drum housing and is located at a central location along the front wall;
a cable carrier rotatably mounted within the drum housing, wherein the cable carrier is rotatable about a second axis relative to the drum housing, and wherein the drum housing further includes a rear wall spaced from the front wall and a generally circumferential side wall extending between the front and rear walls for containing the cable carrier within the interior region; and
a retention assembly configured for retention of one of a sheath of a drain cleaning cable and the output component of the transmission assembly, wherein the retention assembly is removably affixed along a rear wall of the cable carrier, and wherein the retention assembly includes a removable plate positioned over at least one of (i) the sheath of a drain cleaning cable and (ii) the output component of the transmission assembly.

22. The drain cleaning apparatus of claim 21 further comprising: a drain cleaning cable, wherein the cable defines a proximal end and an opposite distal end, and wherein the proximal end is operatively engaged with the output component of the transmission assembly.

23. The drain cleaning apparatus of claim 22 wherein the drain cleaning cable is flexible and includes a protective sheath, and wherein the cable further includes a shaft located within the sheath, wherein the shaft is rotatable by the output component relative to the sheath.

24. The drain cleaning apparatus of claim 22 wherein the drain cleaning cable is disposed in an interior region of the cable carrier.

25. The drain cleaning apparatus of claim 21 further comprising: a clutch for selectively disengaging the input shaft of the transmission assembly from a drain cleaning cable contained in the drum housing.

26. The drain cleaning apparatus of claim 21 wherein the drum housing further includes a handle.

27. The drain cleaning apparatus of claim 21 wherein the drum housing further includes outwardly extending feet for stabilizing the drum housing.

28. The drain cleaning apparatus of claim 21 wherein the drum housing defines an aperture and a drain plug removably disposed in the aperture.

29. The drain cleaning apparatus of claim 28 wherein the aperture is defined within the front wall of the drum housing.

30. The drain cleaning apparatus of claim 21 wherein the retention assembly includes a pair of lips spaced apart so as to receive a drain cleaning cable disposed between the lips.

31. The drain cleaning apparatus of claim 21 wherein the drain cleaning apparatus is free of a power source.

32. A drain cleaning apparatus comprising:
a drum housing defining an interior region, wherein the housing includes a front wall;
a cable carrier rotatable about a first longitudinal axis relative to the drum housing, wherein the cable carrier is disposed within the interior region;
a transmission assembly disposed in the drum housing, wherein the transmission assembly includes
an input shaft rotatable about a second longitudinal axis relative to the cable carrier, wherein the input shaft is accessible along the front wall of the drum housing and is located at a central location along the front wall, and
an output component,
wherein the transmission assembly includes a plurality of gears operatively engaged such that rotary motion of the input shaft is transferred to the output component,
wherein the drum housing further includes a rear wall spaced from the front wall and a generally circumferential side wall extending between the front and rear walls, wherein the drum housing is sized and configured for containing the transmission assembly and the cable carrier within the interior region; and
wherein the first and second longitudinal axes are parallel or coaxial.

33. The drain cleaning apparatus of claim 32 further comprising: a drain cleaning cable, wherein the cable defines a proximal end and an opposite distal end, and wherein the proximal end is operatively engaged with the output component of the transmission assembly.

34. The drain cleaning apparatus of claim 33 wherein the drain cleaning cable is flexible and includes a protective sheath, and wherein the cable further includes a shaft located within the sheath, wherein the shaft is rotatable by the output component relative to the sheath.

35. The drain cleaning apparatus of claim 33 wherein the drain claiming cable is disposed in an interior region of the cable carrier.

36. The drain cleaning apparatus of claim 32 further comprising: a clutch for selectively disengaging the input shaft of the transmission assembly from a drain cleaning cable operatively connected to the output component of the transmission assembly.

37. The drain cleaning apparatus of claim 32 wherein the drum housing further includes a handle.

38. The drain cleaning apparatus of claim 32 wherein the drum housing further includes outwardly extending feet for stabilizing the drum housing when placed upright on a surface.

39. The drain cleaning apparatus of claim 32 wherein the drum housing defines an aperture and a drain plug removably disposed in the aperture.

40. The drain cleaning apparatus of claim 39 wherein the aperture is defined within the front wall of the drum housing.

41. The drain cleaning apparatus of claim 32 further comprising: a retention assembly for a sheath of a drain cleaning cable, wherein the retention assembly is affixed along a wall of the cable carrier.

42. The drain cleaning apparatus of claim 41 wherein the retention assembly includes a removable plate positioned over at least one of (i) the sheath of a drain cleaning cable and (ii) the output component of the transmission assembly.

43. The drain cleaning apparatus of claim 41 wherein the retention assembly includes a pair of lips spaced apart so as to receive a drain cleaning cable disposed between the lips.

44. The drain cleaning apparatus of claim 32 wherein the drain cleaning apparatus is free of a power source.

45. A drain cleaning apparatus comprising:
a drum housing including a front wall, an oppositely directed rear wall, and a generally hollow interior region defined between the front wall and the rear wall;
a cable carrier rotatably mounted about a first longitudinal axis disposed within the interior region, wherein the drum housing further includes a generally circumferential side wall extending between the front and rear walls for containing the cable carrier within the interior region;

a transmission assembly disposed in the drum housing, wherein the transmission assembly includes an input component driven by a power source, wherein the input component is rotatable about a second longitudinal axis independently from the drum housing, and an output component configured for delivering rotary power to a drain cleaning cable end located within the drum housing;

a retention assembly configured for retaining a sheath of a drain cleaning cable, wherein the retention assembly includes (i) a pair of lips spaced apart to receive the drain cleaning cable disposed between the lips and (ii) a removable plate positioned over at least one of the sheath of a drain cleaning cable and the output component of the transmission assembly, wherein the first and second longitudinal axes are parallel or coaxial.

46. The drain cleaning apparatus of claim 45 further comprising: a drain cleaning cable, the cable defining a proximal end and an opposite distal end, the proximal end engaged with the output component of the transmission assembly.

47. The drain cleaning apparatus of claim 46 wherein the drain cleaning cable is flexible and includes a protective sheath, and wherein the cable further includes a shaft located within the sheath, wherein the shaft is rotatable by the output component relative to the sheath.

48. The drain cleaning apparatus of claim 46 wherein the drain cleaning cable is disposed in an interior region of the cable carrier.

49. The drain cleaning apparatus of claim 46 further comprising: a clutch for selectively disengaging the input component of the transmission assembly from the drain cleaning cable.

50. The drain cleaning apparatus of claim 45 wherein the drum housing further includes a handle.

51. The drain cleaning apparatus of claim 45 wherein the drum housing further includes outwardly extending feet for stabilizing the drum housing.

52. The drain cleaning apparatus of claim 45 wherein the drum housing defines an aperture and a drain plug removably disposed in the aperture.

53. The drain cleaning apparatus of claim 52 wherein the aperture is defined within the front wall of the drum housing.

54. The drain cleaning apparatus of claim 45 wherein the transmission assembly includes a plurality of gears engaged such that rotary motion of the input component is transferred to the output component.

55. A drain cleaning apparatus comprising:

a drum housing defining an interior region;

a drain cleaning cable;

a cable carrier rotatably mounted within the interior region of the drum housing, wherein the drain cleaning cable is disposed within the cable carrier, wherein the cable carrier includes a first circumferential outer wall and a concentrically disposed secondary wall, wherein the first wall and the secondary wall define a cable channel, wherein the secondary wall is spaced from the first wall by a radial distance R, wherein the radial distance R is within a range according to formula (I):

$$1.0 \times D < R < 2.0 \times D \quad (I)$$

wherein D is the outer diameter of a sheath of the cleaning cable; and a retention assembly for the sheath, wherein the retention assembly is disposed along a rear wall of the cable carrier, wherein the retention assembly includes a removable plate positioned over at least one of (i) the drain cleaning cable and (ii) an output component of a transmission assembly.

56. The drain cleaning apparatus of claim 55 wherein the drain cleaning cable includes a protective sheath, and a rotatable shaft located within the sheath.

57. The drain cleaning apparatus of claim 55 wherein the drain cleaning cable is arranged in the cable channel of the cable carrier.

58. The drain cleaning apparatus of claim 55 further comprising: a clutch for selectively disengaging an input component of a transmission assembly from the drain cleaning cable.

59. The drain cleaning apparatus of claim 55 further comprising: a bearing assembly disposed between the cable carrier and the drum housing, the bearing assembly for rotatably mounting the cable carrier to the drum housing.

60. The drain cleaning apparatus of claim 55 wherein the drum housing includes a front wall, an oppositely directed rear wall, and a generally circumferential side wall extending between the front wall and the rear wall.

61. The drain cleaning apparatus of claim 55 wherein the drum housing includes a handle.

62. The drain cleaning apparatus of claim 55 wherein the drum housing includes outwardly extending feet for stabilizing the drum housing.

63. The drain cleaning apparatus of claim 55 wherein the drum housing defines an aperture and a drain plug removably disposed in the aperture.

64. The drain cleaning apparatus of claim 63 wherein the aperture is defined within a front wall of the drum housing.

65. The drain cleaning apparatus of claim 55 further comprising: a plurality of wear pads secured along a rear wall of the drum housing.

66. The drain cleaning apparatus of claim 55 wherein the retention assembly includes a pair of lips spaced apart so as to receive the drain cleaning cable disposed between the lips.

67. The drain cleaning apparatus of claim 55 further comprising a transmission assembly including a plurality of gears engaged such that rotary motion of an input component of the transmission assembly is transferred to an output component of the transmission assembly and to the drain cleaning cable.

68. The drain cleaning apparatus of claim 67 wherein an axis of rotation of the input component is coaxial with an axis of rotation of the cable carrier.

69. The drain cleaning apparatus of claim 67 wherein the drain cleaning cable includes a protective sheath, and a rotatable shaft located within the sheath.

70. The drain cleaning apparatus of claim 67 wherein the drain cleaning cable is arranged in the cable channel of the cable carrier.

71. The drain cleaning apparatus of claim 67 further comprising: a clutch for selectively disengaging an input component of a transmission assembly from the drain cleaning cable.

72. The drain cleaning apparatus of claim 67 further comprising: a bearing assembly disposed between the cable carrier and the drum housing, the bearing assembly for rotatably mounting the cable carrier to the drum housing.

73. The drain cleaning apparatus of claim 67 wherein the drum housing includes a front wall, an oppositely directed rear wall, and a generally circumferential side wall extending between the front wall and the rear wall.

74. The drain cleaning apparatus of claim 67 wherein the drum housing includes a handle.

75. The drain cleaning apparatus of claim 67 wherein the drum housing includes outwardly extending feet for stabilizing the drum housing.

76. The drain cleaning apparatus of claim 67 wherein the drum housing defines an aperture and a drain plug removably disposed in the aperture.

77. The drain cleaning apparatus of claim 76 wherein the aperture is defined within a front wall of the drum housing.

78. The drain cleaning apparatus of claim 67 further comprising: a plurality of wear pads secured along a rear wall of the drum housing.

79. The drain cleaning apparatus of claim 67 further comprising: a retention assembly for a sheath of a drain cleaning cable, the retention assembly disposed along a rear wall of the cable carrier.

80. The drain cleaning apparatus of claim 79 wherein the retention assembly includes a removable plate positioned over at least one of (i) a drain cleaning cable and (ii) an output component of a transmission assembly.

81. The drain cleaning apparatus of claim 79 wherein the retention assembly includes a pair of lips spaced apart so as to receive the drain cleaning cable disposed between the lips.

82. The drain cleaning apparatus of claim 67 wherein the drain cleaning system is free of a power source.

83. The drain cleaning apparatus of claim 67 wherein an axis of rotation of the input component is coaxial with an axis of rotation of the cable carrier.

84. The drain cleaning apparatus of claim 55 wherein the drain cleaning system is free of a power source.

85. A system comprising:
(i) a rotary power source and
(ii) a drain cleaning apparatus including
  a drum housing defining an interior region,
  a cable carrier rotatably mounted about a first longitudinal axis within the interior region, wherein the drum housing includes a front wall, a rear wall spaced from the front wall and a generally circumferential side wall extending between the front and rear walls for containing the cable carrier within the interior region, and
  a transmission assembly mounted on the cable carrier and including
    an input component configured for engagement with the rotary power source, wherein the input component is rotatable about a second longitudinal axis independently from the cable carrier, and
    an output component for delivering rotary power to a drain cleaning cable end within the interior region,
wherein the first and second longitudinal axes are parallel or coaxial.

86. A system comprising:
(i) a rotary power source and
(ii) a drain cleaning apparatus including
  a drum housing, wherein the drum housing defines an interior region and includes a front wall,
  a cable carrier rotatably mounted about a first longitudinal axis within the interior region, wherein the drum housing further includes a rear wall spaced from the front wall and a generally circumferential side wall extending between the front and rear walls for containing the cable carrier within the interior region and
  a transmission assembly disposed in the drum housing, the transmission assembly including
    a rotatable input shaft rotatably driven about a second longitudinal axis independently from the cable carrier by the power source, wherein the input shaft is accessible along the front wall of the drum housing and is located at a central location along the front wall, and
wherein the first and second longitudinal axes are parallel or coaxial.

87. A system comprising:
(i) a rotary power source and
(ii) a drain cleaning apparatus including
  a drum housing including a front wall, an oppositely directed rear wall, and a generally hollow interior region defined between the front wall and the rear wall,
  a cable carrier rotatably mounted about a first longitudinal axis within the generally hollow interior region, wherein the drum housing further includes a generally circumferential side wall extending between the front and rear walls for containing the cable carrier within the interior region,
  a transmission assembly disposed in the generally hollow interior region, wherein the transmission assembly includes
    an input component rotatably driven about a second longitudinal axis independently from the cable carrier by the power source and
    an output component for delivering rotary power to an end portion of a drain cleaning cable, wherein the end portion of a drain cleaning cable is located within the generally hollow interior region, and
  a retention assembly for a sheath of a drain cleaning cable, the retention assembly including
    (i) a pair of lips spaced apart to receive the sheath of a drain cleaning cable disposed between the lips and
    (ii) a removable plate positioned over at least one of the sheath of a drain cleaning cable and the output component of the transmission assembly,
wherein the first and second longitudinal axes are parallel or coaxial.

88. A system comprising:
(i) a rotary power source and
(ii) a drain cleaning apparatus including
  a drum housing defining an interior region,
  a transmission assembly disposed in the interior region, wherein the transmission assembly includes an input component rotatably driven about a first longitudinal axis by the power source,
  a drain cleaning cable comprising a shaft surrounded by a sheath, wherein the shaft is rotatable relative to the sheath, and
  a cable carrier rotatably mounted about a second longitudinal axis within the interior region, wherein the drum housing includes a front wall, a rear wall spaced from the front wall, and a generally circumferential side wall that extends between the front wall and the rear wall, for containing the cable carrier and the transmission assembly within the interior region, wherein the cable carrier includes
    a first circumferential outer wall and a concentrically disposed secondary wall, the first circumferential outer wall and the secondary wall defining a cable channel, the secondary wall spaced from the first wall by a radial distance R, the radial distance R being within a range according to formula (I):

$$1.0 \times D < R < 2.0 \times D \quad (I)$$

wherein D is the outer diameter of the sheath, and wherein the first and second longitudinal axes are parallel or coaxial, and wherein the power source rotatably drives the input component about the first axis relative to the cable carrier, and the cable carrier is rotatable about the second axis relative to the housing.

* * * * *